(12) United States Patent
Irinatsu et al.

(10) Patent No.: US 6,312,559 B1
(45) Date of Patent: *Nov. 6, 2001

(54) DEINKING PROCESS USING AMINE COMPOUNDS AND WHITE WATER RECYCLING

(75) Inventors: Yuichi Irinatsu; Yoshitaka Miyauchi; Hiromichi Takahashi, all of Wakayama (JP)

(73) Assignee: Kao Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/940,811

(22) Filed: Sep. 30, 1997

(30) Foreign Application Priority Data

Oct. 2, 1996 (JP) .................................................... 8-261749

(51) Int. Cl.$^7$ ........................................................ D21C 5/02
(52) U.S. Cl. .................................... 162/5; 162/8; 162/190
(58) Field of Search ..................... 162/4, 5, 8, 190

(56) References Cited

U.S. PATENT DOCUMENTS

| | | | |
|---|---|---|---|
| 4,043,908 | * | 8/1977 | Roberts et al. ........................ 210/43 |
| 4,293,097 | * | 10/1981 | Lewis et al. ........................... 241/16 |
| 5,401,360 | * | 3/1995 | Galland ..................................... 162/8 |

FOREIGN PATENT DOCUMENTS

| | | | |
|---|---|---|---|
| 478 505 A2 | * | 9/1991 | (EP) . |
| WO 90/04674A1 | | 5/1990 | (WO) . |
| WO 94/28237A1 | | 12/1994 | (WO) . |
| WO 95/12026A1 | | 5/1995 | (WO) . |
| WO96/31646 | * | 10/1996 | (WO) . |

OTHER PUBLICATIONS

Schriver, K.E., "Mill Chemistry . . . Line Decision", Paper Recycling, pp. 131–134, Nov. 1992.*
Derwent Publications Ltd., London, GB; Class A97, AN 1979–24933B (XP002122804).
Derwent Publications Ltd., London, GB; Class E19, AN 1984–247663 (XP002122805).

* cited by examiner

*Primary Examiner*—Dean T. Nguyen
(74) *Attorney, Agent, or Firm*—Birch, Stewart, Kolasch & Birch, LLP

(57) ABSTRACT

There is provided a deinking process carried out using white water according to which an excellent whiteness and an excellent areal ratio of residual ink fines can be secured while maintaining a proper pulp yield. In the deinking process comprising a flotation step wherein use is made of treatment water containing white water, at least part of the flotation step is effected in the presence of at least one compound selected from the group consisting of cationic compounds, amine compounds, acid salts of amine compounds, and ampholytic compounds.

15 Claims, No Drawings

DEINKING PROCESS USING AMINE COMPOUNDS AND WHITE WATER RECYCLING

TECHNICAL FIELD

The present invention relates to a deinking process for deinking wastepapers such as newspapers, inserts, magazines, woodfree for reclamation thereof. More particularly, the present invention relates to a deinking process excellent in running ability, according to which deinked pulp having a higher whiteness and a smaller number of residual ink fines can be obtained while keeping a proper pulp yield even when washing white water is reused in the flotation step.

BACKGROUND ART

Although newspapers, magazines, office automation wastepapers, etc. have been recycled from of old, effective utilization of wastepapers has particularly recently become increasingly important in connection with global environmental problems such as protection of forest resources and refuse disposal. In addition, the use of deinked pulp has advanced to the utilization thereof as a higher-rank pulp, as exemplified by the use of deinked waste newspaper pulp for making printing paper B glade. Meanwhile, recent wastepapers have been getting into more and more severe circumstances from the standpoint of deinking in keeping with changes in printing techniques, printing methods, printing ink components, etc. Thus, it has been desired to develop a deinking process comprising a proper yield, a high whiteness and little residual ink. Accordingly, for example, improvements in a variety of chemicals have hitherto been made.

Meanwhile, as a decrease in the amount of treatment water for use in a deinking process is also desirable in aspects of the source of supply and environmental protection, white water is circulated and utilized, in general. White water refers to treatment water subjected to drainage and filtration in various steps of the deinking process. Specifically, in the flotation step, white water subjected to drainage in the washing or papermaking step after the flotation step is usually circulated and used as diluent water or the like before flotation for pulp slurry after the aging or bleaching step. Since, however, such circulation of white water gives rise to accumulation of ink fines and fibers in white water, the whiteness of deinked pulp is lowered as the circulation of white water is repeated. Further, used chemicals such as the deinking agent in particular are also concentrated to extremely increase foamability in the flotation step, thus causing a great decrease in the yield. The concentration of inorganic salts mainly comprising calcium ions and the like derived from a filler and the like is also not negligible as a cause of increasing foamability. In any event, the circulation of white water lowers the performance of deinked pulp and the efficiency of deinking. Despite the foregoing circumstances, there have surprisingly been made scarcely any investigations on the deinking agent and the deinking system that can maintain a deinking performance even in a white water circulation or recycling system. Thus, the fact is that a suitable amount of fresh water is used for dilution, or that additional waste water treatment equipment is operated.

JP-A 8-337085 discloses a deinking method in which floatation is conducted in the presence of a cationic compound, an amine compound, an acid salt of an amine compound or an amphoteric compound, but fails to use such a compound in floatation step using a white water.

Although circulation and reuse of white water in the deinking process are desirable in aspects of resources conservation, operation, etc., circulation of white water without causing decreases in the whiteness and yield has been getting into difficult circumstances. Accordingly, solution to this has been desired.

DISCLOSURE OF THE INVENTION

As a result of intensive investigations made in view of the foregoing circumstances with a view to providing a deinking system causing no decreases in the whiteness and the areal ratio of residual ink fines while maintaining a proper yield even in a white water circulation system, the inventors of the present invention have confirmed that the deinking performance that can be seen in respects of the whiteness and the areal ratio of residual ink fines can be improved without causing any decrease in the performance as can be seen in conventional deinking processes, when white water is rather positively circulated and reused in the presence of a cationic compound, an amine compound, an acid salt of amine compound, or an ampholytic compound in the flotation step wherein use is made of treatment water containing white water. The present invention has been completed based on this confirmation.

The present invention provides to a deinking process comprising a flotation step using treatment water containing white water, wherein during or at least at a point in time of the flotation step it is effected in the presence of at least one compound selected from the group consisting of (1) cationic compounds, (2) amine compounds and acid salts of amine compounds, and (3) ampholytic compounds.

Further, the present invention provides a deinking process wherein at least one compound of (1) cationic compounds, (2) amine compounds and acid salts of amine compounds, and (3) ampholytic compounds may be used in combination with an organic compound.

In other words, the invention is a method for deinking wastepaper which comprises the step of conducting at least part of floatation step in the presence of at least one addtive compound selected from (1) a cationic compound, (2) an amine compound, an acid salt of an amine compound or (3) an amphoteric compound, characterized by conducting floatation with a treating water including a white water.

It is preferable that the white water is repeatedly circulated into the floatation system while further portions of the addtive compound(s) are added so that a given content of the addtive compound(s) may be maintained. It is preferable to add the addtive compound(s) every circulation. The addition may be conducted during or at a point in time of the floatation step. It may be conducted also just before floatation. It is preferable that the amount in total of the addtive compounds ranges from 0.001 to 5.0 percent by weight based on the weight of the wastepaper.

In the deinking process of the present invention, the flotation step is preferably effected using treatment water containing white water discharged in the steps following the flotation step. White water discharged in the steps preceding the flotation step, e.g., in the step of disintegrating wastepaper, is unsuitable for use in the flotation step because it contains a considerable amount of ink.

The steps following the flotation step include the washing step, the draining step, and the papermaking step. In general, at least 50%, preferably at least 70%, of white water discharged in these steps is mixed with fresh water if necessary to be circulated as treatment water for use in the flotation step.

In the present invention, although the circulation of white water is done at least once, it is desirably at least three times since the difference of the present invention from the prior art becomes remarkable in respects of the whiteness and the areal ratio of residual ink fines.

Further, according to the present invention, at least part of the flotation step is effected in the presence of at least one compound selected from the group consisting of cationic compounds, amine compounds, acid salts of amine compounds, and ampholytic compounds. The amount of such a compound(s) to be added is preferably 0.001 to 5.0 wt. %, especially preferably 0.05 to 2 wt. %, based on the weight of wastepaper.

Further, in the present invention, the pH value of the system in the flotation step is desirably set to be 4 to 12, preferably 6 to 11, further preferably 6 to 9. When the flotation step is carried out at a pH falling within this range, a better deinking effect can be secured.

As used in the present invention, the term "pH value of the system" in the flotation step refers to the pH of the aqueous solution portion of a water-pulp slurry during the flotation step. It is desirable to adjust the pH in the flotation step by adding an acid such as hydrochloric acid or sulfuric acid, or a base such as sodium hydroxide or potassium hydroxide according to need.

Furthermore, the flotation step may comprise, for example, two or more stages. In such a case, it will suffice when the conditions of white water circulation and the pH value of the system are met at least in one stage of the flotation step, but it is preferable that they are adjusted in a plurality of stages of flotation and especially just before the first stage of flotation in the foregoing manner.

In the deinking process of the present invention, a surfactant is used in order to release ink from the wastepaper as feedstock. Specifically, the use of at least one surfactant selected from among nonionic surfactants, anionic surfactants, and cationic surfactants is preferred, among which nonionic surfactants are especially preferred.

According to the present invention, the operation of white water circulation that has hitherto been believed to lower the whiteness and yield, even when done, not only causes no decreases in such a performance, but also can positively attain an improvement in the deinking performance as can be seen in respects of the whiteness and the areal ratio of residual ink fines when the number of times of circulation is increased. The action mechanism therefor is believed to be as follows: Ink fines and filler that cannot be removed according to any conventional processes can be flocculated to a suitable size in the presence of at least one compound selected from the group consisting of cationic compounds, amine compounds, acid salts of amine compounds, and ampholytic compounds in the flotation system to strengthen the interaction thereof with air bubbles during flotation, whereby the efficiency of removal can be enhanced. This function of ink fines flocculation can enhance the efficiency of deinking to thereby improve the whiteness, the areal ratio of residual ink fines, and the yield in comparison with those of any conventional processes. According to conventional processes, ink fines and filler that cannot be removed in the flotation step are flowed into the system in the subsequent washing step and the like, and white water containing ink fines and the like is further circulated to and used in flotation. By contrast, since the rate of ink fines and like removal in the flotation step is increased according to the present invention as described above, the whiteness can be improved even in the white water circulation system, while a good yield can be maintained because of no increase in the amount of frothing as would otherwise be caused by concentration of the filler. As described above, in the present invention, even when white water is used for circulation, the same efficiency of deinking can be attained as in the use of fresh water therefor. Although the reason for the increase in the effect attained by rather positively using white water cannot necessarily be specified, it is conceivable that cationic compounds, amine compounds, acid salts of amine compounds or ampholytic compounds is accumulated through white water circulation.

In the deinking process of the present invention, at least one compound selected from the group consisting of cationic compounds, amine compounds, acid salts of amine compounds, and ampholytic compounds is added to the system during flotation. Specific examples of these compounds will now be described.

<Cationic Compounds>

A cationic compound is preferably selected from the group consisting of compounds represented by the following formulae from ($a_1$) to ($e_1$) and cationic polymers represented by the following formulae from ($f_1$) to ($j_1$) and having a cationic nitrogen content of 0.01 to 35 wt. % and a weight-average molecular weight of 2,000 to 3,000,000. Especially preferred are cationic compounds represented by the following formula ($a_1$).

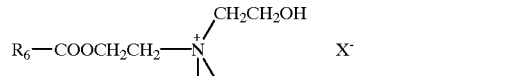

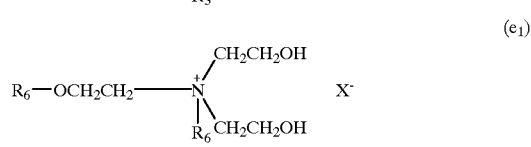

in the formulae from ($a_1$) to ($e_1$), $R_1$ and $R_2$, which may be the same or different, are each an alkyl, alkenyl or β-hydroxyalkyl group having 10 to 24 carbon atoms; $R_3$, $R_4$ and $R_5$, which may be the same or different, are each an alkyl or hydroxyalkyl group having 1 to 8 carbon atoms, a benzyl group, or a group represented by the formula: —(AO)$_n$—Z (wherein AO is an oxyalkylene group having 2 to 4 carbon atoms; Z is a hydrogen atom or an acyl group; and n is an integer of 1 to 50); $R_6$ is an alkyl, alkenyl or β-hydroxyalkyl group having 8 to 36 carbon atoms; X⁻ is a counter ion; and Y is an alkyl, alkenyl or β-hydroxyalkyl group having 8 to 36 carbon atoms, a group represented by the formula: $R_6$COOCH$_2$—(wherein $R_6$ is as defined above), a group represented by the formula: $R_6CONHCH_2$—(wherein $R_6$ is as defined above), or a group represented by the formula: $R_6OCH_2$—(wherein $R_6$ is as defined above).

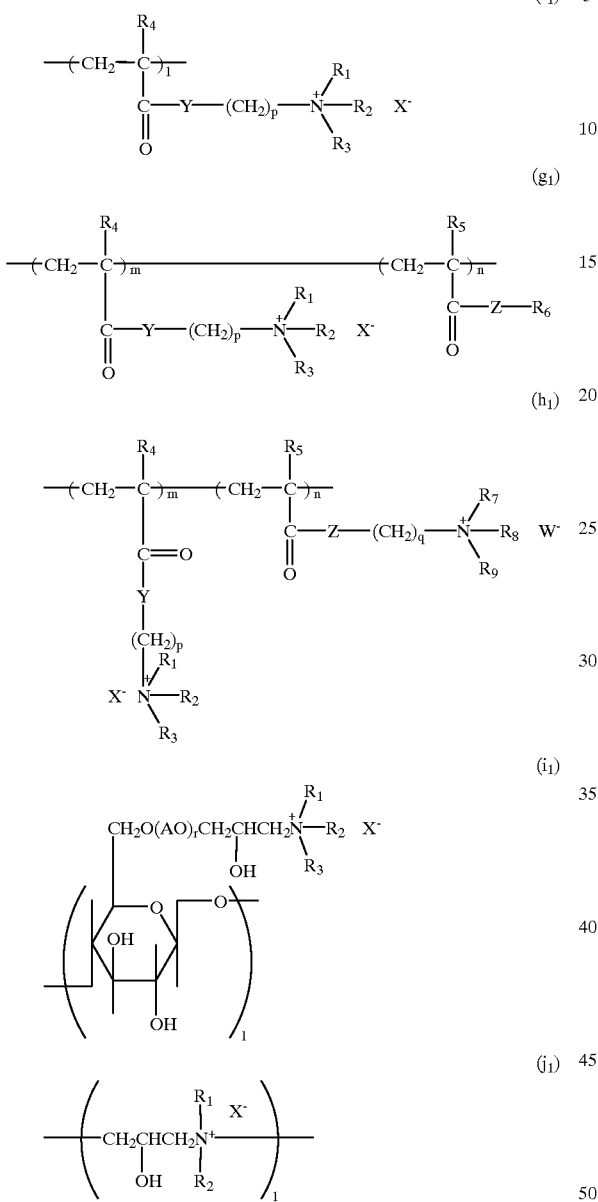

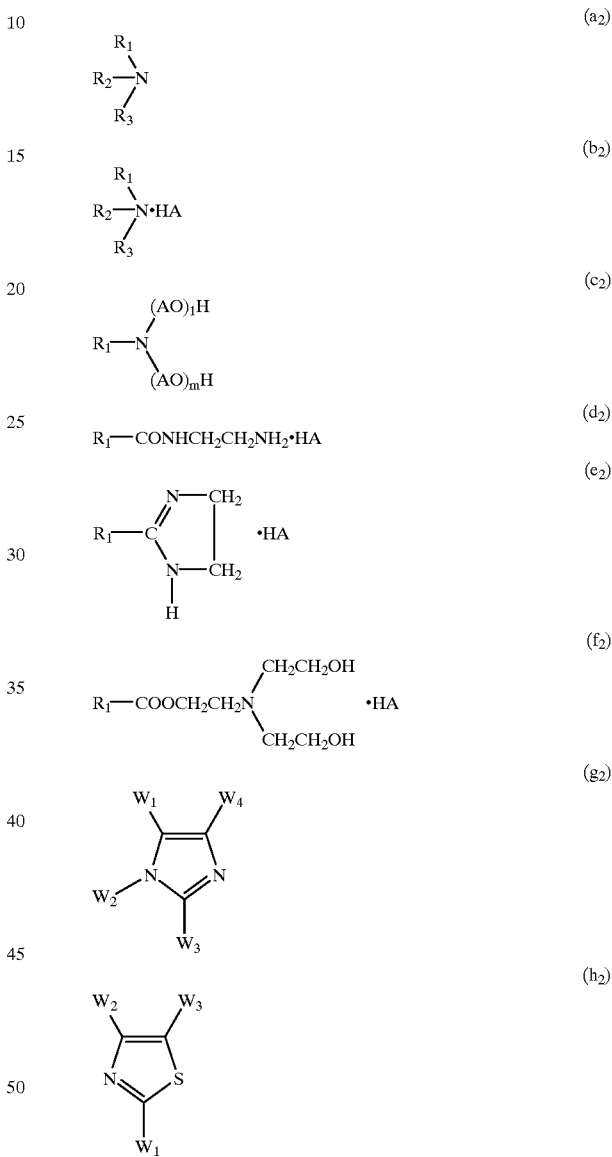

in the formulae from ($f_1$) to ($j_1$), $R_1$, $R_2$, $R_3$, $R_6$, $R_7$, $R_8$ and $R_9$, which may be the same or different, are each an alkyl group having 1 to 24 carbon atoms or an alkenyl group having 2 to 24 carbon atoms; $R_4$ and $R_5$, which may be the same or different, are each a hydrogen atom or a methyl group; $X^-$ and $W^-$, which may be the same or different, are each a counter ion; Y and Z, which may be the same or different, are each O or NH; AO is an oxyalkylene group having 2 to 4 carbon atoms; p and q, which may be the same or different, are each an integer of 1 to 10; r is an integer of 0 to 10; and l, m and n are each such a positive number that the weight-average molecular weight of the polymer falls within the range of 2,000 to 3,000,000.

<Amine compounds and Acid Salts of Amine compounds>

An amine compound or an acid salt of amine compound is preferably selected from the group consisting of compounds represented by the following formulae from ($a_2$) to ($h_2$) and polymers represented by the following formulae from ($i_2$) to ($l_2$) and having an amino nitrogen content of 0.01 to 35 wt. % and a weight-average molecular weight of 2,000 to 3,000,000. Especially preferred are amine compounds and acid salts of amine compounds represented by the following formulae from ($a_2$) to ($b_2$).

in the formulae from ($a_2$) to ($h_2$), $R_1$ is an alkyl, alkenyl or β-hydroxyalkyl group having 8 to 36 carbon atoms; $R_2$ and $R_3$, which may be the same or different, are each a hydrogen atom, an alkyl group having 1 to 24 carbon atoms, or an alkenyl group having 2 to 24 carbon atoms; HA is an inorganic or organic acid; AO is an oxyalkylene group having 2 to 4 carbon atoms; l and m are each 0 or a positive integer, provided that l+m is an integer of 1 to 300; and $W_1$, $W_2$, $W_3$ and $W_4$, which may be the same or different, are each a hydrogen atom or an alkyl group having 1 to 24 carbon atoms.

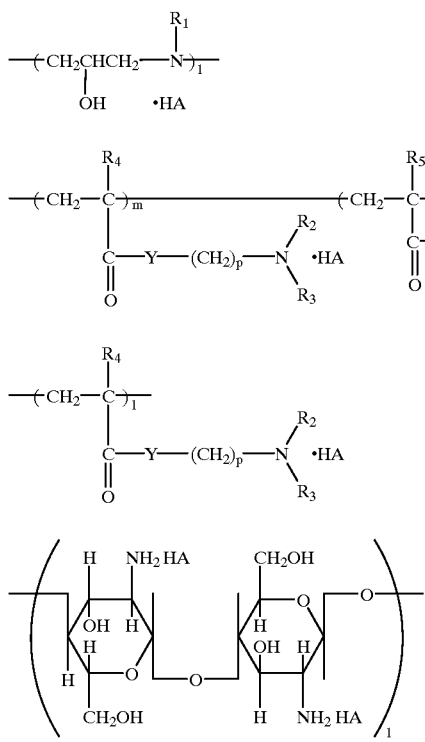

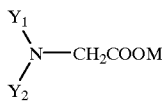

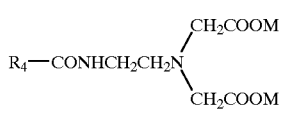

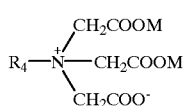

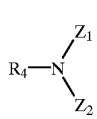

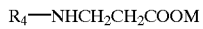

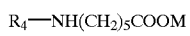

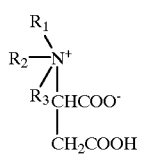

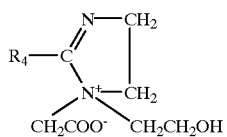

in the formulae from ($i_2$) to (12), $R_1$ is an alkyl group having 1 to 24 carbon atoms or an alkenyl group having 2 to 24 carbon atoms; $R_2$, $R_3$ and $R_6$, which may be the same or different, are each a hydrogen atom, an alkyl group having 1 to 24 carbon atoms, or an alkenyl group having 2 to 24 carbon atoms; $R_4$ and $R_5$, which may be the same or different, are each a hydrogen atom or a methyl group; HA is an inorganic or organic acid; Y is O or NH; p is an integer of 1 to 10; and l, m and n are each such a positive integer that the weight-average molecular weight of the polymer falls within the range of 2,000 to 3,000,000.

<Ampholytic Compounds>

An ampholytic compound is preferably selected from the group consisting of compounds represented by the following formulae from ($a_3$) to ($j3$), phospholipids ($k_3$), proteins ($l_3$), and ampholytic polymers represented by the following formulae ($m_3$) and ($n_3$) and having a cationic nitrogen content of 0.01 to 35 wt. % and a weight-average molecular weight of 2,000 to 3,000,000. Especially preferred are ampholytic compounds represented by the following formula ($b_3$).

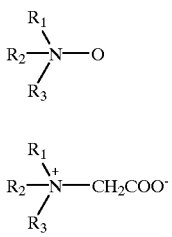

in the formulae from ($a_3$) to ($J_3$), $R_1$, $R_2$ and $R_3$ which may be the same or different, are each an alkyl group having 1 to 24 carbon atoms or an alkenyl group having 2 to 24 carbon atoms; $R_4$ is an alkyl, alkenyl or β-hydroxyalkyl group having 8 to 36 carbon atoms; M is a hydrogen atom, an alkali metal atom, ½ mole of an alkaline earth metal atom or an ammonium group; $Y_1$ is a group represented by the formula: $R_5NHCH_2CH_2$—(wherein $R_5$ is an alkyl group having 1 to 36 carbon atoms or an alkenyl or hydroxyalkyl group having 2 to 36 carbon atoms); $Y_2$ is a hydrogen atom or a group represented by the formula: $R_5NHCH_2CH_2$—(wherein $R_5$ is as defined above); $Z_1$ is a group represented by the formula: —$CH_2COOM$ (wherein M is as defined above); and $Z_2$ is a hydrogen atom or a group represented by the formula: —$CH_2COOM$ (wherein M is as defined above).

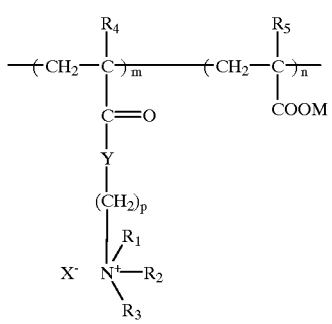

(m₃)

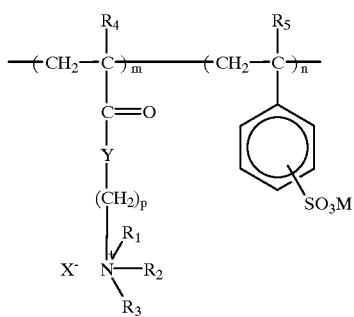

(n₃)

in the formulae (m₃) and (n₃), $R_1$, $R_2$ and $R_3$, which may be the same or different, are each a hydrogen atom, an alkyl group having 1 to 24 carbon atoms, or an alkenyl group having 2 to 24 carbon atoms; $R_4$ and $R_5$, which may be the same or different, are each a hydrogen atom or a methyl group; M is a hydrogen atom, an alkali metal atom, ½ mole of an alkaline earth metal atom, or an ammonium group; X⁻ is a counter ion; Y is O or NH; p is an integer of 1 to 10; and m and n are each such a positive integer that the weight-average molecular weight of the polymer falls within the range of 2,000 to 3,000,000.

Among the cationic compounds, amine compounds, acid salts of amine compounds, and ampholytic compounds, an amine compound or an acid salt of amine compound is especially preferably used.

At least one compound selected from the group consisting of cationic compounds, amine compounds, acid salts of amine compounds, and ampholytic compounds may be added in any step wherein the concentration of the flotation system can be adjusted. Thus, it may be added in any step before flotation, such as the disintegration step and the bleaching step, just before flotation or during flotation (e.g., an initial stage of the flotation step), or, in the washing step after flotation to be circulated together with white water. At least one compound selected from the group consisting of cationic compounds, amine compounds, acid salts of amine compounds and ampholytic compounds is preferably added just before flotation or at a point of the flotation step or into the circulating water, and is especially preferably added to the slurry after the pH of the flotation system is adjusted to a value of 4 to 9.

<Organic acid>

In the deinking process of the present invention, at least one compound selected from the group consisting of the compounds (1), (2) and (3) is preferably used in combination with an organic compound represented by the following formula (a₄) or an ion thereof at least at a point in time of the flotation step from the standpoint of improvement in the whiteness and decrease in the areal ratio of residual ink fines.

$$X_1-O-(AO)_n-X_2 \quad (a_4)$$

Wherein $X_1$ is a hydrogen atom, an alkyl or alkenyl group, having 1 to 24 carbon atoms, or a group represented by the formula: —CH₂COOH, —SO₃H, or —PO₃H₂; $X_2$ is a group represented by the formula : —CH₂COOH, —SO₃H, or —PO₃H₂; AO is an oxyalkylene group having 2 to 4 carbon atoms; and n is a number of 1 to 200.

The organic acid may be used together with any of the compounds (1), (2) and (3).

The organic acid may be used in the form of acid or ion thereof (ionized organic acid). The organic acid may be used as a counter ion (X⁻) to (1) the cationic compounds. The organic acid (HA) may be used to form an acid salt of an amine compound (2). The organic acid may be used in combination with (3) the ampholytic compounds. When the former is used, an object compound can be obtained by a conventional ion-exchange method by replacing the counter ion of the cationic compound by the residue of the organic acid.

In the formula (a₄), it is preferable that $X_1$ and $X_2$ are —CH₂COOH; AO is an oxyalkylene group having 2 or 3 carbon atoms, such as ethylene oxide and propylene oxide, more preferably ethylene oxide. Then random or block addition of ethylene oxide and propylene oxide is preferably used. n is preferably an integer of 1 to 50.

The amount of the organic acid and the compounds (1), (2) and (3) is preferably 0.005 to 10.0 wt. %, especially preferably 0.01 to 2.0 wt. %, based on the weight of wastepaper.

The organic acid or an ion thereof (B) is preferably used at a mole ratio of (A) the compound(s) of (1), (2) and (3), to (B) the organic acid or ion thereof being from 10/1 to 1/10, more preferably 2/1 to 1/2.

In the step of releasing ink of the present invention, at least one surfactant is used for ink release. As the surfactant, there can be used those known as conventional deinking agents, preferably cationic surfactants, anionic surfactants, and nonionic surfactants, among which nonionic surfactants are especially preferred. The use of at least one compound selected from among the following nonionic surfactants (A) to (D) is preferred. <Nonionic surfactant (A): A reaction product obtained by adding an alkylene oxide to a mixture of an oil & fat and an alcohol>

A nonionic surfactant (A) is an alkylene oxide adduct of a mixture of an oil & fat and a mono- or polyhydric alcohol. The alkylene oxide is added to the mixture described above in an amount, on the average, of 5 to 300 moles, preferably 20 to 150 moles, per mole of the mixture. Examples of the alkylene oxide include ethylene oxide, propylene oxide, and butylene oxide, which may be used alone or in the form of a mixture of two or more of them.

The mixing ratio of the oil & fat to the alcohol is preferably 1/0.1 to 1/6, particularly preferably 1/0.3 to 1/3. When this ratio falls with in the above-mentioned range, a reclaimed pulp having an excellent appearance can be obtained since the ink releasing is efficiently attained.

Examples of the oils & fats as a starting material of the nonionic surfactant (A) include vegetable oils such as coconut oil, palm oil, olive oil, soybean oil, rape seed oil, and linseed oil; animal oils such as lard, beef tallow, and bone oil; and fish oils; hardened oils and semihardened oils thereof; and recovered oils obtained in refining processes of these oils & fats. Especially preferred are coconut oil, palm oil, and beef tallow.

Examples of the monohydric alcohol as a starting material of the nonionic surfactant (A) include those having an alkyl or alkenyl moiety of 8 to 24 carbon atoms, and those having an alkylphenyl moiety wherein the alkyl moiety has 6 to 14 carbon atoms. Those having an alkyl moiety of 12 to 18 carbon atoms are preferred.

Examples of the polyhydric alcohols as a starting material of the nonionic surfactant (A) include ethylene glycol, propylene glycol, glycerol, and trimethylolpropane. <Nonionic surfactant (B): a compound represented by the formula: $RCOO(AO)_m R'$>

Wherein R represents an alkyl or alkenyl group having 7 to 23 carbon atoms; R' represents a hydrogen atom, an alkyl group having 1 to 22 carbon atoms, an alkenyl group having 2 to 22 carbon atoms, or an acyl group having 2 to 22 carbon atoms, preferably a hydrogen atom; AO represents an oxyalkylene group having 2 to 4 carbon atoms; and m is an integer of 1 or more. The average number of moles of AO to be added is preferably 5 to 300. Further, use of ethylene oxide and propylene oxide in combination as AO is preferred. The ethylene oxide/propylene oxide molar ratio is preferably 1/5 to 5/1. Among nonionic surfactants (B), those having an alkyl or alkenyl group, particularly an alkyl group, represented by R of 11 to 23 carbon atoms are preferred.
<Nonionic surfactant (C): a compound represented by the formula: $RO(AO)_n H$>

Wherein R represents an alkyl or alkenyl group having 8 to 24 carbon atoms; AO represents an oxyalkylene group having 2 to 4 carbon atoms; and n is an integer of 1 or more. The average number of moles of AO to be added is preferably 5 to 300, further preferably 7 to 150. Further, use of ethylene oxide and propylene oxide in combination as AO is preferred. The ethylene oxide/propylene oxide molar ratio is preferably 1/5 to 5/1.
<Nonionic surfactant (D): A reaction product obtained by adding an alkylene oxide to a polyvalent carboxylic acid or an acid anhydride thereof, or a reaction product obtained by adding an alkylne oxide to a mixture of a polyvalent (or polybasic) carboxylic acid or an acid anhydride thereof, and an alcohol>

The nonionic surfactant (D) is prepared by using a polyvalent carboxylic acid or an acid anhydride thereof (I) and an alcohol (II). The compounds (I) and (II) are preferably used in a molar ratio of (I) to (II) of 1/0.02 to 5, particularly 1/0.1 to 3.

Next, suitably usable examples of anionic surfactants include salts of higher fatty acids, salts of alkylsulfonic acids, salts of alkylbenzenesulfonic acids, salts of alkylsulfuric esters, and salts of alkyl ether sulfuric acids. Usable examples of cationic surfactants include quaternary ammonium salts, among which mono long-chain alkyl type of quaternary ammonium salts are especially suitable.

The surfactant may be added in any step of the deinking process, though it is usually added in the pulping step. The amount of the surfactant to be added, though not particularly limited, is preferably 0.01 to 10 wt. %, especially preferably 0.05 to 3 wt. %, based on the wastepaper as feedstock. A known deinking agent other than the above-mentioned nonionic surfactants (A) to (D) may of course be used in combination.

The deinking process of the present invention is one which comprises at least the step of releasing ink from the wastepaper as feedstock, the step of removing the released ink by flotation, the step of washing the deinked pulp slurry and the step of draining the washed pulp slurry, wherein a surfactant, preferably at least one of the above-mentioned nonionic surfactants, may be used in order to release ink, wherein white water discharged from the steps following the flotation step is circulated into treatment water in the flotation step in order to use white water in the flotation step, and wherein at least part of the flotation step is effected in the presence of at least one compound selected from the group consisting of cationic compounds, amine compounds, acid salts of amine compounds and ampholytic compounds as exemplified hereinabove.

EXAMPLES

The following Examples will illustrate the present invention in more detail, though it should not be construed as limiting the scope of the present invention.

Example 1

Wastepapers as Feedstock (newspapers/inserts: 70/30) which had been recovered in a city were cut into 5 cm×5 cm pieces. A given amount of them was fed into a bench disintegrator. Then, warm water, 1 wt. % (based on the feedstock) of sodium hydroxide, 3 wt. % (based on the feedstock) of sodium silicate, 3 wt. % (based on the feedstock) of a 30% aqueous solution of hydrogen peroxide and 0.3 wt. % (based on the feedstock) of a block adduct of 20 moles of EO (ethylene oxide) and 15 moles of PO (propylene oxide) (average number of moles for addition) to stearyl alcohol as a deinking agent were added thereto, and the resultant mixture was disintegrated at a pulp concentration of 5 wt. % at 40° C. for 10 minutes. The resulting pulp slurry was aged at 40° C. for 60 minutes, then admixed and diluted with washing white water to a pulp concentration of 1 wt. %, then adjusted with respect to the pH by using sulfuric acid or an aqueous solution of sodium hydroxide as shown in Table 1, further admixed with the following amine compound (II-b-1) to have the concentration (based on the feedstock) as shown in Table 1, and then subjected to a flotation treatment at 40° C. for 10 minutes.

Further, no amine compound was added in Comparative Examples. After the flotation treatment, the pulp slurry was treated on a TAPPI standard sheet machine to form a pulp sheet, which was then pressed under a pressure of 5 kgf/cm², and then air-dried. The whiteness of the pulp sheet and the amount of residual ink in the pulp sheet were measured. Here, the whiteness of the pulp sheet was measured with a colorimetric color difference meter, while the amount of residual ink was represented by an areal ratio of residual ink fines in the pulp sheet obtained from the pulp slurry (after flotation) as measured using an image analyzer (magnification: ×100). A 1% improvement in the whiteness of the pulp sheet and a 0.1% decrease in the areal ratio of residual ink fines in the pulp sheet can be visually recognized as a sufficient improvement in the quality of the pulp sheet. Further, the yield of pulp was determined from the absolute dry weight of pulp contained in the pulp slurry before flotation and the absolute dry weight of pulp contained in flotation reject, i.e., according to the equation:

$$\frac{\begin{pmatrix}\text{absolute dry weight of}\\ \text{pulp contained in pulp}\\ \text{slurry before flotation}\end{pmatrix} - \begin{pmatrix}\text{absolute dry weight}\\ \text{of pulp contained}\\ \text{in flotation reject}\end{pmatrix}}{\begin{pmatrix}\text{absolute dry weight of}\\ \text{pulp contained in pulp}\\ \text{slurry before flotation}\end{pmatrix}} \times 100.$$

The results are shown in Table 1.

As for washing white water used in diluting pulp in flotation, fresh water was used at first (No. 0), and a mixture of 80 wt. % of white water and 20 wt. % of fresh water, wherein the white water was one discharged when the pulp slurry after flotation was drained to the pulp concentration of 10 wt. %, was thereafter used as washing white water. The number of times of circulation in Table 1 is the number of times of circulation of white water obtained by drainage (the same will apply in the following Examples).

Amine Compound II-b-1

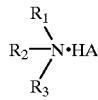

wherein $R_1$ is a $C_1$–$C_{12}$ alkyl group; $R_2$ and $R_3$ are H; and HA is $CH_3COOH$.

of 15 moles of EO and 10 moles of PO (average number of moles for addition) to stearic acid as a deinking agent were added thereto, and the resultant mixture was disintegrated at a pulp concentration of 25 wt. % at 40° C. for 10 minutes. The resulting pulp slurry was aged at 40° C. for 60 minutes, then admixed and diluted with washing white water to a pulp concentration of 1 wt.%, then adjusted with respect to a pH by using sulfuric acid or an aqueous solution of sodium hydroxide as shown in Table 2, further admixed with 0.3 wt. % (based on the feedstock) of the following cationic compound (I-a-1), and then subjected to a flotation treatment at 40° C. for 10 minutes.

Further, in Comparative Examples, no cationic compound (I-a-1) was added. Thereafter, a pulp sheet was formed in the same manner as in Example 1, and the yield, the whiteness

TABLE 1

| | | pH | amt. of II-b-1 (wt. %) | No. of Times of White Water Circulation | Whiteness (%) | Areal Ratio of Residual Ink Fines (%) | Reference Data Yield (%) |
|---|---|---|---|---|---|---|---|
| Comp. Test Ex. 1 | 1 | 10 | 0 | 0 | 52.0 | 0.882 | 86.8 |
| | 2 | 10 | 0 | 1 | 52.4 | 0.851 | 86.1 |
| | 3 | 10 | 0 | 2 | 51.5 | 0.933 | 85.8 |
| | 4 | 10 | 0 | 3 | 50.5 | 1.002 | 85.4 |
| | 5 | 10 | 0 | 4 | 49.8 | 1.109 | 85.2 |
| | 6 | 10 | 0 | 5 | 49.4 | 1.143 | 85.0 |
| | 7 | 10 | 0 | 20 | 49.2 | 1.170 | 85.0 |
| Test Ex. 1 | 1 | 10 | 0.2 | 0 | 55.1 | 0.581 | 90.0 |
| | 2 | 10 | 0.2 | 1 | 55.3 | 0.563 | 90.1 |
| | 3 | 10 | 0.2 | 2 | 55.7 | 0.522 | 89.8 |
| | 4 | 10 | 0.2 | 3 | 55.9 | 0.492 | 89.6 |
| | 5 | 10 | 0.2 | 4 | 56.1 | 0.483 | 89.5 |
| | 6 | 10 | 0.2 | 5 | 56.2 | 0.475 | 89.5 |
| | 7 | 10 | 0.2 | 20 | 56.1 | 0.481 | 89.7 |
| Test Ex. 2 | 1 | 10 | 0.8 | 0 | 57.8 | 0.306 | 87.4 |
| | 2 | 10 | 0.8 | 1 | 57.9 | 0.293 | 87.7 |
| | 3 | 10 | 0.8 | 2 | 58.2 | 0.268 | 87.5 |
| | 4 | 10 | 0.8 | 3 | 58.3 | 0.265 | 87.5 |
| | 5 | 10 | 0.8 | 4 | 58.4 | 0.255 | 87.4 |
| | 6 | 10 | 0.8 | 5 | 58.5 | 0.249 | 87.5 |
| | 7 | 10 | 0.8 | 20 | 58.4 | 0.253 | 87.7 |
| Test Ex. 3 | 1 | 7 | 0.2 | 0 | 58.4 | 0.451 | 90.3 |
| | 2 | 7 | 0.2 | 1 | 56.8 | 0.407 | 90.7 |
| | 3 | 7 | 0.2 | 2 | 56.7 | 0.416 | 90.3 |
| | 4 | 7 | 0.2 | 3 | 57.0 | 0.392 | 90.3 |
| | 5 | 7 | 0.2 | 4 | 57.1 | 0.382 | 90.3 |
| | 6 | 7 | 0.2 | 5 | 57.2 | 0.373 | 90.2 |
| | 7 | 7 | 0.2 | 20 | 57.3 | 0.366 | 90.3 |
| Test Ex. 4 | 1 | 7 | 0.8 | 0 | 58.3 | 0.258 | 88.4 |
| | 2 | 7 | 0.8 | 1 | 58.4 | 0.249 | 88.7 |
| | 3 | 7 | 0.8 | 2 | 58.4 | 0.250 | 88.3 |
| | 4 | 7 | 0.8 | 3 | 58.5 | 0.250 | 88.5 |
| | 5 | 7 | 0.8 | 4 | 58.7 | 0.222 | 88.4 |
| | 6 | 7 | 0.8 | 5 | 58.8 | 0.219 | 88.4 |
| | 7 | 7 | 0.8 | 20 | 58.8 | 0.221 | 88.7 |

In this Table, Test Examples 1 to 4 correspond to the process of the present invention, while "0" for Number of White Water Circulation in each Test Example corresponds to a control (the same will apply in the following Examples).

Example 2

Wastepapers as feedstock (newspapers/inserts: 70/30) which had been recovered in a city were cut into 5 cm×5 cm pieces. A given amount of them was fed into a bench disintegrator. Then, warm water, 1 wt. % (based on the feedstock) of sodium hydroxide, 3 wt. % (based on the feedstock) of sodium silicate, 3wt. % (based on the feedstock) of a 30% aqueous solution of hydrogen peroxide and 0.3 wt. % (based on the feedstock)of a random adduct and the amount of residual ink were measured in the same manner as in Example 1. The results are shown in Table 2.

Cationic Compound I-a-1

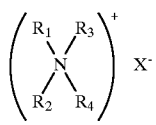

wherein $R_1$ stands for a $C_{10}$ alkyl group; $R_2$ stands for a $C_{24}$ alkyl group; $R_3$ stands for a $C_1$ alkyl group; $R_4$ stands for a $C_1$ alkyl group; and $X^-$ stands for $Cl^-$.

TABLE 2

|  |  | pH | No. of Times of White Water Circulation | Whiteness (%) | Areal Ratio of Residual Ink Fines (%) | Reference Data Yield (%) |
|---|---|---|---|---|---|---|
| Comp. Test Ex. 2 | 1 | 10 | 0 | 51.0 | 0.993 | 85.0 |
|  | 2 | 10 | 1 | 51.3 | 0.961 | 84.7 |
|  | 3 | 10 | 2 | 50.8 | 1.038 | 84.4 |
|  | 4 | 10 | 3 | 50.3 | 1.057 | 84.3 |
|  | 5 | 10 | 4 | 49.6 | 1.133 | 84.1 |
|  | 6 | 10 | 5 | 49.4 | 1.152 | 84.0 |
|  | 7 | 10 | 20 | 49.3 | 1.158 | 84.0 |
| Test Ex. 5 | 1 | 10 | 0 | 54.9 | 0.602 | 88.0 |
|  | 2 | 10 | 1 | 55.3 | 0.564 | 88.1 |
|  | 3 | 10 | 2 | 55.4 | 0.554 | 88.2 |
|  | 4 | 10 | 3 | 55.5 | 0.542 | 88.1 |
|  | 5 | 10 | 4 | 55.6 | 0.539 | 87.9 |
|  | 6 | 10 | 5 | 55.8 | 0.511 | 88.0 |
|  | 7 | 10 | 20 | 55.7 | 0.523 | 88.1 |

Example 3

Wastepapers as feedstock (newspapers/inserts: 70/30) which had been recovered in a city were cut into 5 cm×5 cm pieces. A given amount of them was fed into a bench disintegrator. Then, warm water, 1 wt. % (based on the feedstock) of sodium hydroxide, 3 wt. % (based on the feedstock) of sodium silicate, 3 wt. % (based on the feedstock) of a 30% aqueous solution of hydrogen peroxide and 0.35 wt. * (based on the feedstock) of a block adduct of 75 moles of EO and 15 moles of PO (average number of moles for addition) to beef tallow/glycerol (1:0.5 in a molar ratio) was a deinking agent were added thereto, and the resultant mixture was disintegrated at a pulp concentration of 5 wt. % at 40° C. for 10 minutes. The resulting pulp slurry was aged at 40° C. for 60 minutes, then admixed and diluted with washing white water to a pulp concentration of 1 wt. %, then adjusted with respect to a pH by using sulfuric acid or an aqueous solution of sodium hydroxide as shown in Table 3, further admixed with 0.1 wt. (based on the feedstock) of an ampholytic compound (III-b-1), and then subjected to a flotation treatment at 40° C. for 10 minutes.

Further, in Comparative Examples, no ampholytic compound (III-b-1) was added. Thereafter, a pulp sheet was formed in the same manner as in Example 1, and the yield, the whiteness and the amount of residual ink were measured in the same manner as in Example 1. The results are shown in Table 3.

Compound III-b-1

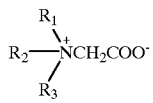

wherein $R_1$ stands for a $C_{12}$ alkyl group; $R_2$ stands for a $C_1$ alkyl group; and $R_3$ stands for a $C_1$ alkyl group.

TABLE 3

|  |  | pH | No. of Times of White Water Circulation | Whiteness (%) | Areal Ratio of Residual Ink Fines (%) | Reference Data Yield (%) |
|---|---|---|---|---|---|---|
| Comp. Test Ex. 3 | 1 | 10 | 0 | 51.0 | 0.991 | 86.1 |
|  | 2 | 10 | 1 | 51.2 | 0.966 | 85.8 |
|  | 3 | 10 | 2 | 50.6 | 1.028 | 85.7 |
|  | 4 | 10 | 3 | 50.1 | 1.077 | 85.5 |
|  | 5 | 10 | 4 | 49.8 | 1.110 | 85.4 |
|  | 6 | 10 | 5 | 49.7 | 1.116 | 85.3 |
|  | 7 | 10 | 20 | 49.6 | 1.128 | 85.3 |
| Test Ex. 6 | 1 | 7 | 0 | 55.8 | 0.507 | 90.1 |
|  | 2 | 7 | 1 | 56.1 | 0.482 | 90.2 |
|  | 3 | 7 | 2 | 56.2 | 0.471 | 90.0 |
|  | 4 | 7 | 3 | 56.3 | 0.456 | 89.9 |
|  | 5 | 7 | 4 | 56.4 | 0.447 | 90.0 |
|  | 6 | 7 | 5 | 56.3 | 0.461 | 90.2 |
|  | 7 | 7 | 20 | 56.4 | 0.451 | 90.4 |

Example 4

Wastepapers as feedstock (newspapers/inserts: 70/30) which had been recovered in a city were cut into 5 cm×5 cm pieces. A given amount of them was fed into a bench disintegrator. Then, warm water, 1 wt. % (based on the feedstock) of sodium hydroxide, 3 wt. % (based on the feedstock) of sodium silicate, 3 wt. % (based on the feedstock) of a 30% aqueous solution of hydrogen peroxide and 0.35 wt. % (based on the feedstock)of a random adduct of 30 moles of EO and 30 moles of PO (average number of moles for addition) to stearyl alcohol as a deinking agent were added thereto, and the resultant mixture was disintegrated at a pulp concentration of 5 wt. % at 40° C. for 10 minutes. The resulting pulp slurry was aged at 40° C. for 60 minutes, then admixed and diluted with washing white water to a pulp concentration of 1 wt. %, then adjusted with respect to a pH by using sulfuric acid or an aqueous solution of sodium hydroxide as shown in Table 4, further admixed with 0.2 wt. % (based on the feedstock) of a mixture of the following amine compound, cationic compound or ampholytic compound in combination with an organic acid at an equivalent mole ratio, and then subjected to a flotation treatment at 40° C. for 10 minutes.

Further, in Comparative Examples, no amine compound, cationic compound or ampholytic compound in combination with organic acid was added. Thereafter, a pulp sheet was formed in the same manner as in Example 1, and tile yield, Ampholytic compound III-b-1

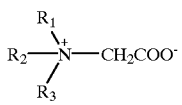

wherein $R_1$ stands for a $C_{12}$ alkyl group; $R_2$ stands for $C_1$ alkyl group; and $R_3$ stands for $C_1$ alkyl group.

organic acid α

$CH_3COOH$ organic acid β-1

$HOOC-CH_2-O-(CH_2CH_2O)_6-CH_2COOH$

TABLE 4

|  |  | pH | Compd. | Organic acid (same amount by mole) | No. of Times of White Water Circulation | Whiteness (%) | Areal Ratio of Residual Ink Fines (%) | Reference Data Yield (%) |
|---|---|---|---|---|---|---|---|---|
| Comp. Test Ex. 4 | 1 | 10 | — | — | 0 | 53.0 | 0.872 | 85.1 |
|  | 2 | 10 | — | — | 5 | 50.4 | 1.130 | 83.3 |
|  |  |  |  | amine compound |  |  |  |  |
| Test Ex. 7 | 1 | 10 | II-a-1 | α | 0 | 55.7 | 0.574 | 86.4 |
|  | 2 | 10 | II-a-1 | α | 5 | 56.8 | 0.470 | 85.9 |
| Test Ex. 8 | 1 | 10 | II-a-1 | β-1 | 0 | 57.2 | 0.510 | 87.5 |
|  | 2 | 10 | II-a-1 | β-1 | 5 | 57.1 | 0.419 | 87.0 |
|  |  |  |  | cationic compound |  |  |  |  |
| Test Ex. 9 | 1 | 10 | I-a-1 | — | 0 | 55.0 | 0.594 | 85.0 |
|  | 2 | 10 | I-a-1 | — | 5 | 56.2 | 0.483 | 84.8 |
| Test Ex. 10 | 1 | 10 | I-a-1 | β-1 | 0 | 56.6 | 0.513 | 86.6 |
|  | 2 | 10 | I-a-1 | β-1 | 5 | 56.7 | 0.421 | 86.3 |
|  |  |  |  | ampholytic compound |  |  |  |  |
| Test Ex. 11 | 1 | 10 | III-b-1 | — | 0 | 54.4 | 0.603 | 85.9 |
|  | 2 | 10 | III-b-1 | — | 5 | 55.6 | 0.488 | 85.7 |
| Test Ex. 12 | 1 | 10 | III-b-1 | β-1 | 0 | 56.1 | 0.517 | 87.4 |
|  | 2 | 10 | III-b-1 | β-1 | 5 | 56.2 | 0.423 | 87.2 | the whiteness and the amount of residual ink were measured in the same manner as in Example 1. The results are shown in Table 4.

Amine compound II-a-1

wherein $R_1$ stands for a $C_{12}$ alkyl group; $R_2$ stands for H; and $R_3$ stands for H.

Cationic compound I-a-1

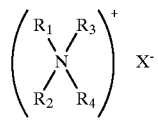

wherein $R_1$ stands for a $C_{10}$ alkyl group; $R_2$ stands for $C_{24}$ alkyl group; $R_3$ stands for $C_1$ alkyl group; $R_4$ stands for $C_1$ alkyl group; and $X^-$ stands for $Cl^-$.

Example 5

Wastepapers as feedstock (newspapers/inserts: 70/30) which had been recovered in a city were cut into 5 cm×5 cm pieces. A given amount of them was fed into a bench disintegrator. Then, warm water, 1 wt. % (based on the feedstock) of sodium hydroxide, 3 wt. % (based on the feedstock) of sodium silicate, 3wt. % (based on the feedstock) of a 30% aqueous solution of hydrogen peroxide and 0.3 wt. % (based on the feedstock)of a random adduct of 20 moles of EO and 5 moles of PO (average number of moles for addition) to stearic acid as a deinking agent were added thereto, and the resultant mixture was disintegrated at a pulp concentration of 25 wt. % at 40° C. for 10 minutes. The resulting pulp slurry was aged at 40° C. for 60 minutes, then admixed and diluted with washing white water to a pulp concentration of 1 wt. %, then adjusted with respect to a pH by using sulfuric acid or an aqueous solution of sodium hydroxide as shown in Table 5, further admixed with 0.2 wt. % (based on the feedstock) of a mixture of the following amine compound and an organic compound at an equivalent mole ratio, and then subjected to a flotation treatment at 40° C. for 10 minutes.

Further, in Comparative Examples, no amine compound and organic acid was added. Thereafter, a pulp sheet was formed in the same manner as in Example 1, and the yield, the whiteness and the amount of residual ink were measured in the same manner as in Example 1. The results are shown in Table 5.

Amine compound II-a-1

wherein $R_1$ stands for a $C_{12}$ alkyl group; $R_2$ stands for H; and $R_3$ stands for H.

Organic acid α

CH$_3$COOH

Organic acid β-2

HOOC—CH$_2$—O—(EO)$_{10}$-(PO)$_3$—(EO)$_{10}$—CH$_2$COOH wherein EO stands for —CH$_2$—CH$_2$—O—; and PO stands for

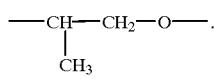

Organid acid γ-1

R$_1$—O—(CH$_2$CH$_2$O)$_{50}$—CH$_2$COOH wherein $R_1$ stands for $C_{18}$ alkyl group.

Organic acid β-3

HO$_3$S—O—(CH$_2$CH$_2$O)$_8$—SO$_3$H

Organic acid β-4

H—O—(CH$_2$CH$_2$O)$_{10}$—PO$_3$H$_2$

a$_2$

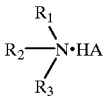

b$_2$ wherein $R_1$ is an alkyl, or β-hydroxyalkyl group having 8 to 36 carbon atoms; $R_2$ and $R_3$, which may be the same or different, are each a hydrogen atom, an alkyl group having 1 to 24 carbon atoms, or an alkenyl group having 2 to 24 carbon atoms; HA is an organic acid; and wherein said at least one compound selected from the group consisting of amine compounds and acid salts of amine compounds is present in an amount of 0.001 to 5.0 wt. % based on the weight of wastepaper; and the white water is recycled three or more times in the flotation step.

2. The deinking process as claimed in claim 1, which further comprises circulating as treatment water to be used in the flotation step, at least 50% of the white water discharged after the flotation step.

3. The deinking process as claimed in claim 1, wherein the flotation step is carried out at a pH value of 4 to 12.

4. The deinking process as claimed in claim 1, wherein at least one surfactant is used in order to release ink.

5. The deinking process as claimed in claim 1, wherein the treatment water comprises 50 wt. % or more of white

TABLE 5

| | pH | Amine Compd. | Organic acid (same amount by mole) | No. of Times of White Water Circulation | Whiteness (%) | Areal Ratio of Residual Ink Fines (%) | Reference Data Yield (%) |
|---|---|---|---|---|---|---|---|
| Comp. | 1 | 10 | — | — | 0 | 50.6 | 1.112 | 83.6 |
| Test Ex. 5 | 2 | 10 | — | — | 5 | 49.2 | 1.213 | 82.7 |
| Test Ex. 13 | 1 | 10 | II-a-1 | α | 0 | 54.7 | 0.611 | 87.6 |
| | 2 | 10 | II-a-1 | α | 5 | 54.9 | 0.532 | 87.2 |
| Test Ex. 14 | 1 | 10 | II-a-1 | β-2 | 0 | 56.2 | 0.542 | 88.7 |
| | 2 | 10 | II-a-1 | β-2 | 5 | 56.4 | 0.475 | 88.3 |
| Test Ex. 15 | 1 | 10 | II-a-1 | γ-1 | 0 | 56.6 | 0.536 | 87.9 |
| | 2 | 10 | II-a-1 | γ-1 | 5 | 56.8 | 0.469 | 87.5 |
| Test Ex. 16 | 1 | 10 | II-a-1 | β-3 | 0 | 55.6 | 0.548 | 88.8 |
| | 2 | 10 | II-a-1 | β-3 | 5 | 55.8 | 0.479 | 88.4 |
| Test Ex. 17 | 1 | 10 | II-a-1 | β-4 | 0 | 55.0 | 0.531 | 88.3 |
| | 2 | 10 | II-a-1 | β-4 | 5 | 55.2 | 0.465 | 87.9 |

What is claimed is:

1. A deinking process comprising:

using treatment water containing white water discharged from a washing step or a draining step in a flotation step; and adding during at least part of the flotation step at least one compound selected from the group consisting of amine compounds having the formula a$_2$ and acid salts of amine compounds having the formula b$_2$ consisting of amine compounds and acid salts of amine compounds is present in an amount of 0.001 to 5.0 wt. % based on the weight of wastepaper; and the white water is recycled three or more times in the flotation step;

washing the pulp slurry; and draining the pulp slurry.

6. The deinking process as claimed in claim 1, wherein the treatment water comprises 50 wt. % to 80 wt. % white water and the remainder of the treatment water is fresh water recycled into the flotation step.

7. The deinking process as claimed in claim 1, wherein the treatment water comprises 80 wt. % white water and 20 wt. % fresh water recycled into the flotation step.

8. A de-inking process comprising using treatment water containing white water in a flotation step, and adding during at least part of the flotation step, at least one compound selected from amine compounds having the formula a2 and acid salts of amine compounds having the formula b₂

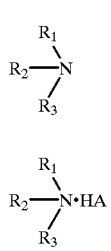

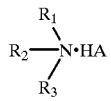

wherein R₁ is an alkyl, or β-hydroxyalkyl group having 8 to 36 carbon atoms; R₂ and R₃, which may be the same or different, are each a hydrogen atom, an alkyl group having 1 to 24 carbon atoms, or an alkenyl group having 2 to 24 carbon atoms; HA is an organic acid; and wherein said at least one compound selected from the group consisting of amine compounds and acid salts of amine compounds is present in an amount of 0.001 to 5.0 wt. % based on the weight of wastepaper; and the white water is recycled three or more times in the flotation step.

9. The deinking process as claimed in claim 8, which further comprises circulating as treatment water to be used in the flotation step, at least 50% of the white water discharged after the flotation step.

10. The deinking process as claimed in claim 9, wherein the white water is circulated to a flotation system just before the flotation step.

11. The deinking process as claimed in claim 8, wherein the flotation step is carried out at a pH value of 4 to 12.

12. The deinking process as claimed in claim 8, wherein at least one surfactant is used in order to release ink.

13. The deinking process as claimed in claim 8, wherein said at least one compound selected from the group consisting of amine compounds and acid salts of amine compounds is present in an amount of 0.001 to 5.0 wt. % based on the weight of wastepaper.

14. A de-inking process comprising using water containing white water untreated from the de-inking process in a flotation step and adding during at least part of the flotation step at least one compound selected from the group consisting of water and the remainder of the treatment water is fresh water recycled into the flotation step.

15. A deinking process comprising:
liberating ink from waste paper;
using treatment water containing white water discharged from a washing step or a draining step in a flotation step to form a pulp slurry;
adding during at least part of the flotation step at least one compound selected from the group consisting of amine compounds having the formula a₂ and acid salts of amine compounds having the formula b₂

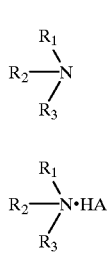

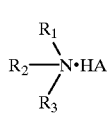

wherein R₁ is an alkyl, or β-hydroxyalkyl group having 8 to 36 carbon atoms; R₂ and R₃, which may be the same or different, are each a hydrogen atom, an alkyl group having 1 to 24 carbon atoms, or an alkenyl group having 2 to 24 carbon atoms; HA is an organic acid; and wherein said at least one compound selected from the group amine compounds having the formula a₂ and acid salts of amine compounds having the formula b₂

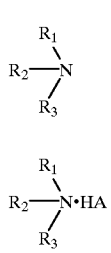

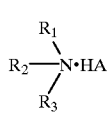

wherein R₁ is an alkyl, or β-hydroxyalkyl group having 8 to 36 carbon atoms; R₂ and R₃, which may be the same or different, are each a hydrogen atom, an alkyl group having 1 to 24 carbon atoms or an alkenyl group having 2 to 24 carbon atoms; HA is an organic acid; and wherein said at least one compound selected from the group consisting of amine compounds and acid salts of amine compounds is present in an amount of 0.001 to 5.0 wt. % based on the weight wastepaper; and the white water is recycled three or more times the flotation step.

* * * * *